United States Patent [19]
Czegledi

[11] Patent Number: 5,582,548
[45] Date of Patent: Dec. 10, 1996

[54] METHOD OF MANUFACTURE OF ANTI-SLIP FASTENER

[76] Inventor: Imre Czegledi, Apt. R22, 644 Lafayette Ave., Hawthorne, N.J. 07506

[21] Appl. No.: 734,189

[22] Filed: Jul. 22, 1991

Related U.S. Application Data

[63] Continuation-in-part of Ser. No. 506,812, Apr. 10, 1990, abandoned.

[51] Int. Cl.$^6$ .............................. B21H 3/02; B23G 9/00; F16B 23/00
[52] U.S. Cl. .................. 470/9; 470/11; 411/404; 411/407
[58] Field of Search .......................... 411/402, 403, 411/406, 407, 919; 470/9, 8, 11

[56] References Cited

U.S. PATENT DOCUMENTS

| | | | |
|---|---|---|---|
| 1,056,095 | 3/1913 | Groos | 411/406 X |
| 1,934,347 | 11/1933 | Flesselles | 411/407 |
| 2,182,092 | 12/1939 | O'Leary | 470/9 |
| 2,538,350 | 1/1951 | Baule | 411/403 |
| 2,631,624 | 3/1953 | Wright | 411/407 |
| 2,684,094 | 7/1954 | Lissy | 411/407 |
| 2,792,039 | 5/1957 | Wing et al. | 411/407 X |
| 3,540,342 | 11/1970 | Vaughn | 411/407 |
| 4,033,003 | 7/1977 | Marroquin | 411/403 |
| 4,190,091 | 2/1980 | Colognori | 81/436 X |
| 4,339,971 | 7/1982 | Zatorre | 411/407 X |
| 4,497,225 | 2/1985 | Vaughn | 411/407 |
| 4,538,486 | 9/1985 | Lutrat | 411/407 X |
| 4,572,039 | 2/1986 | Desjardins | 411/407 |
| 4,856,953 | 8/1989 | Lin | 411/407 |
| 4,911,593 | 3/1990 | Kephart | 411/407 |

Primary Examiner—Neill R. Wilson
Attorney, Agent, or Firm—Alfred C. Hill

[57] ABSTRACT

A fastener system includes a fastener and a driver tool in which the fastener includes a cavity for insertion of the driver tool and in which the driver tool and the fastener form an interlocking relationship between the driver tool and the fastener is formed by having a portion of the fastener overlie a portion of the driver tool. This interlocking relationship prevents accidental separation of the driver tool from the fastener and consequent marring of the surfaces of the work pieces being joined together and also prevents stripping of the driver tool and the fastener cavity.

2 Claims, 9 Drawing Sheets

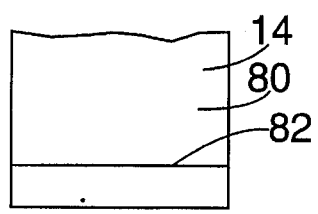
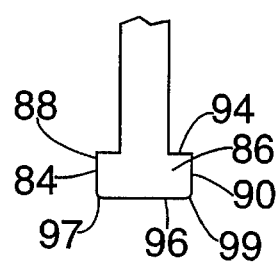
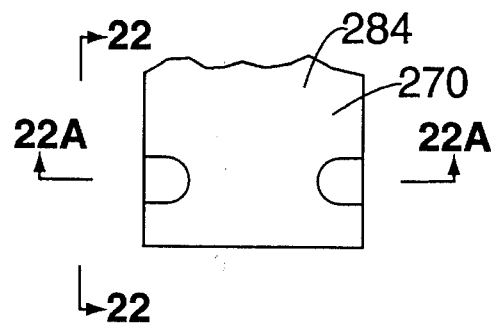
FIG. 19　　　FIG. 20　　　FIG. 21
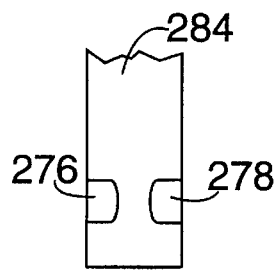
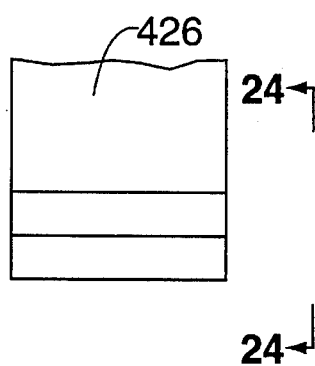
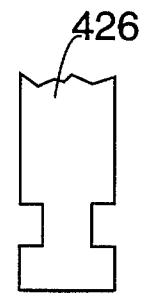
FIG. 22　　　FIG. 23　　　FIG. 24
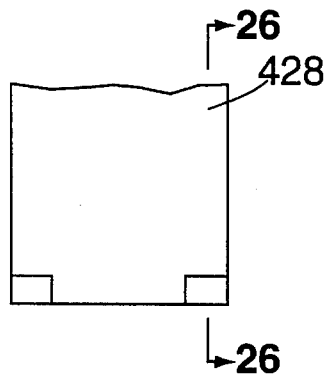
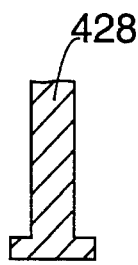
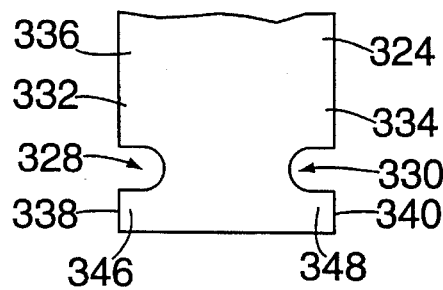
FIG. 25　　　FIG. 26　　　FIG. 27

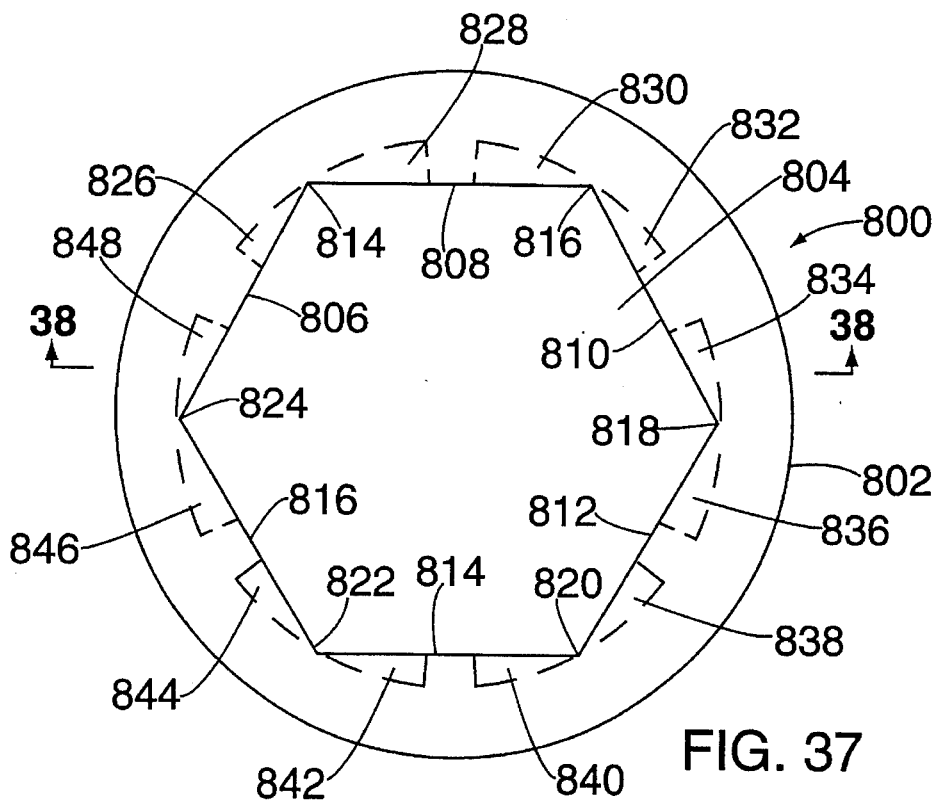
FIG. 37
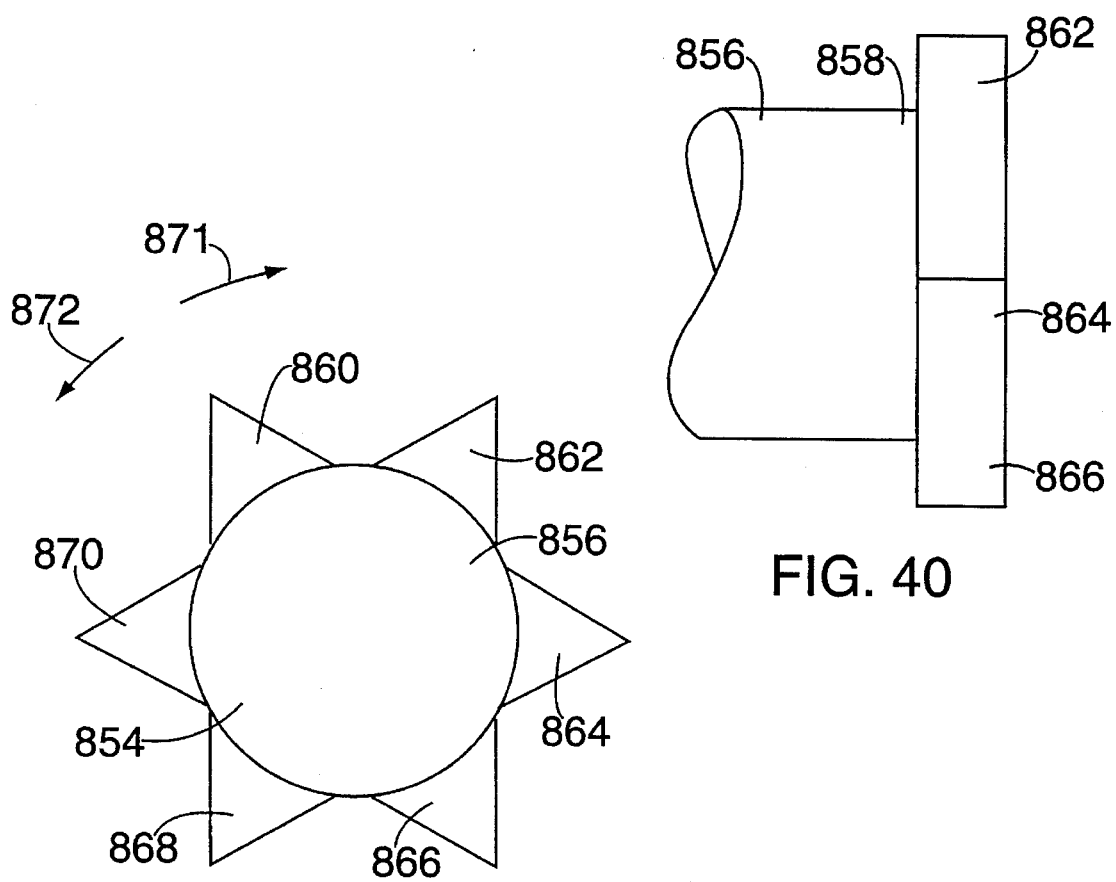
FIG. 40
FIG. 39

METHOD OF MANUFACTURE OF ANTI-SLIP FASTENER

CROSS-REFERENCE TO RELATED APPLICATION

This application is a continuation-in-part of previously filed application Ser. No. 07/506,812, filed on Apr. 10, 1990 now abandoned.

BACKGROUND OF THE INVENTION

1. Field of the Invention

This invention relates generally to fastener systems and more particularly to a fastener system having attaching hardware and interlocking driver tools by which the tool remains securely nested and interlocked in a slot or aperture formed in the attaching hardware during installation and removal of the attaching hardware. The fastener system according to the present invention is adaptable to the fastening of a broad range of materials and is adaptable to both manual and automatic operation. The fastener system according to the present invention includes fasteners which are readily and economically manufactured using existing mass production manufacturing equipment.

2. Information Disclosure Statement

In the practice of fastening there has been a long-felt need for a fastener system which prevents the slipping of the driver tool from the fastener during operation and the consequent marring and damage to the work under construction.

The inventor is actively engaged in furniture manufacturing and is knowledgeable in fastener systems that have been developed over the past fifty years. His knowledge extends to fasteners used for the fastening of wood, metal, plastic and composition materials and no fastener system which solves the technical problems solved by the present invention is known to the inventor.

In the prior application, an Examiner's search which included fasteners and associated driving tools in Class 411/Subclasses 407 and 403 yielded the following references:

| ITEM | U.S. PAT. NO. | INVENTOR | ISSUE DATE |
| --- | --- | --- | --- |
| A | 4,911,592 | R. Dewain Kephart | 03/27/90 |
| B | 4,856,952 | Ming-Tang Lin | 08/15/89 |
| C | 4,572,039 | Warren Desjardins | 02/25/86 |
| D | 4,538,486 | Jacques Lutrat | 09/03/85 |
| E | 4,497,225 | John Vaughn | 02/05/85 |
| F | 4,033,003 | Emilio R. Marroquin | 07/05/77 |
| G | 3,540,342 | Rudolph Marion Vaughn | 11/17/70 |
| H | 2,792,039 | G.S. Wing et al. | 05/14/57 |
| I | 2,684,094 | John Lissy | 07/20/54 |
| J | 2,631,624 | Roland H. Wright | 03/17/53 |

This application expands on the prior submittal in the area of method of manufacture and the application is thereby differentiated from the preceding application.

OBJECTS OF THE INVENTION

It is an object of the present invention to provide a fastener system having an interlocking driver tool and a fastener device.

Another object of the present invention is to provide a fastener system in which a driver tool is in positive engagement with an aperture formed in a fastener during fastening or fastener removal operations.

Another object of the present invention is to provide a fastener system which is capable of both manual and automatic operation.

Another object of the present invention is to provide a fastener system in which a portion of a fastener projects over a portion of a driver tool.

Another object of the present invention in which a fastener and a driver tool remains in an interlocked condition even when the longitudinal axis of the driver tool forms an angular relationship with the longitudinal axis of the fastener.

Another object of the present invention is to provide an interlocking fastener system including fastener devices which can be operated using standard driver tools.

Another object of the present invention is to provide a fastener system having an interlocking driver tool and fastener device which are economical to manufacture using existing mass production equipment.

Another object of the present invention is to provide a fastener system in which an interlocking driver tool and fastener prevents accidental slipping of the driver tool away from the fastener and marring of the work-piece which is under construction.

Another object of the present invention is to provide a fastener system which facilitates compliance with officially regulated torque requirements.

Still another object of the present invention is to provide a method for the manufacture of a fastener system in which a portion of the fastener projects over a portion of the driver tool.

SUMMARY OF THE INVENTION

In accordance with the present invention there is provided a fastener system which includes a fastener and a driver tool. The fastener includes a cavity, or aperture, into which the driver tool may be inserted in a positive interlocking and driving relationship in which a portion of the faster overlies a portion of the fastener tool thereby forming the interlocking relationship. The interlocking relationship between the fastener and the driver tool prevents accidental and unwanted separation of the driver tool from the fastener and possible consequent marring or other damage to the surface of the working pieces being fastened together. The interlocking relationship between the fastener and the driver tool also prevents stripping the head of the fastener and damage to the driver tool.

The present invention also includes a novel method for the manufacture of fasteners using conventional mass production cold-heading equipment. The method of manufacturer includes a first step and a second step. In the first step a wedge shaped cavity is formed in the head of a fastener, with a portion of the top surface of the fastener adjacent to the wedge shaped cavity being raised above the balance of the top surface of the fastener. In the second step a portion of the raised material is caused to flow toward the wedge shaped cavity thereby partially closing the upper portion of the wedge shaped cavity and forming a portion of the fastener head which is capable of overlying or interlocking with a driver tool which may be inserted into the cavity.

BRIEF DESCRIPTION OF THE DRAWINGS

Additional objects and a fuller understanding of the present invention may be had by referring to the drawings in which:

FIG. 19 is a side view of the driver shown in FIG. 1;

FIG. 20 is an end view of the driver of FIG. 19;

FIG. 21 is a side view of a second embodiment of the driver of FIG. 19;

FIG. 22 is a view taken along the line 22—22 of FIG. 21;

FIG. 23 is a side view of a third embodiment of the driver of FIG. 19;

FIG. 24 is a view taken along the line 24—24 of FIG. 23;

FIG. 25 is a side view of a fourth embodiment of the driver of FIG. 19;

FIG. 26 is a cross-sectional view taken along the line 26—26 of FIG. 25;

FIG. 27 is a side view of a fifth embodiment of the driver of FIG. 19;

FIG. 37 is a top view of an eighth embodiment of the fastener of FIG. 1;

FIG. 39 is a top view of a top view of a seventh embodiment of the driver of FIG. 16;

FIG. 40 is a side view of the driver of FIG. 39;

DETAILED DESCRIPTION OF THE INVENTION

Figure 1:
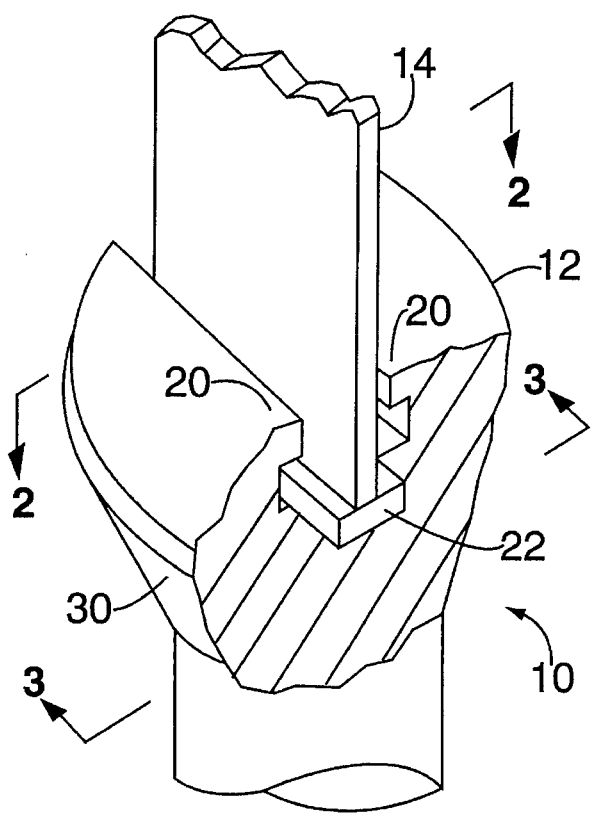
FIG. 1 is an overall perspective view of a fastener system made in accordance with the present invention with a portion of the fastener shown broken away to depict the positive interlocking engagement between the fastener and the driver members.
Figure 2:
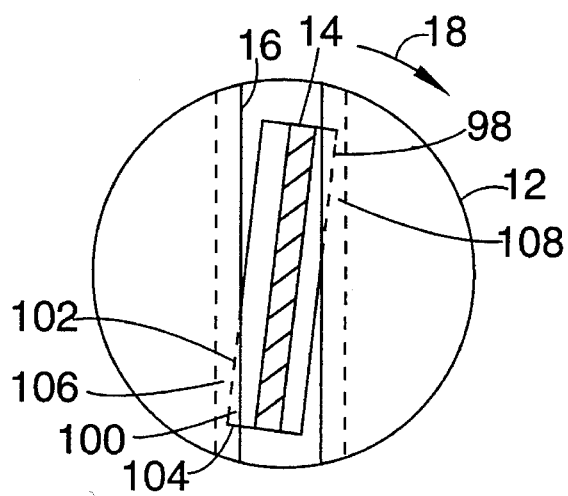
FIG. 2 is a cross-sectional view taken along the line 2—2 of FIG. 1.

With reference to the drawings there is shown in FIG. 1 an overall perspective view of the primary embodiment of a fastener system 10 made in accordance with the present invention. The fastener system 10 comprises a fastener 12 and a driver tool 14. FIG. 2 shows the driver tool 14 in use engaging the slot 16 of the fastener 12 and rotating in the direction shown by the arrow 18 and thereby causing rotation of the fastener 12.

Figure 3:
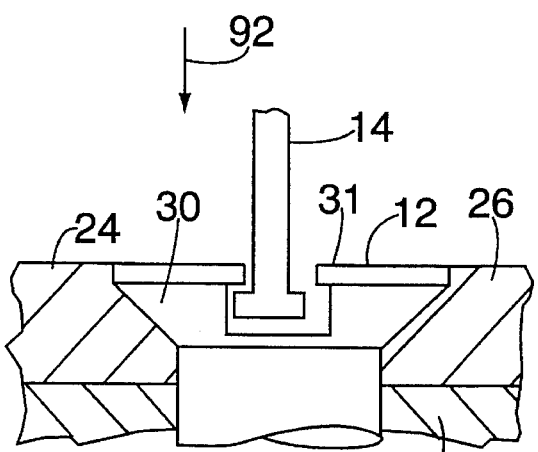
FIG. 3 is a cross-sectional view taken along the line 3—3 of FIG. 1 showing the operation of the fastener system with the axes of the driver and the fastener in alignment and showing the fastener system fastening two work-pieces.

FIGS. 1, 2 and 3 depict a novel feature of the present invention in which a portion 20 of the fastener 12 projects over, or overlies, a portion 22 of the driver tool 14 and thereby prevents unwanted accidental separation of the driver tool 14 from the fastener 12 and possible consequent marring and damage to the surface 24 of the work pieces 26, 28 being fastened or stripping or damage to the fastener 12 or to the driver tool 14.

The novel feature of the present invention as described above and as explained further during the course of this specification is applicable to the entire range of fasteners including small instrument-type fasteners used in precision instruments such as chronometers and the largest of fasteners used in carpentry, furniture manufacture and outdoor structures. The invention is likewise applicable to the entire range of fastener applications such as the joining of wood, plastic, various types of metal and to fasteners which have slots or apertures of a variety of geometrical configurations. The invention may be applied to fasteners which are slotted having open ends, slotted having closed ends, slotted configurations in which the slots are crossed or angularly disposed or Phillips type or any other type of fastener in which a driver tool is inserted into a cavity which is formed in the head of the fastener. The present invention is likewise applicable to fasteners irrespective of the thread profile, thread form, thread diameter or thread pitch.

The present invention provides a fastener system 10 in which the fastener 12 interlocks with the driver tool 14 so that a component of the driving force is used for interlocking reinforcement. This feature overcomes the problem of conventional fastener systems in which the driving force is typically applied within a straight walled slot and is translated by the threads into motion of the fastener to achieve the desired degree of clamping action. When the resistance to motion of the conventional fastener overcomes the forces holding the driver tool in place, the driver tool slips away from the slot potentially causing injury to the operator and damage to the work piece or damage to the fastener or to the driver tool.

As is shown in the primary embodiment of the invention 10, shown in FIGS. 1–6 and 8, the head 30 of the fastener 12 includes an open ended slot 32. The slot 32 has at its upper end 34 a generally narrower portion 36 which communicates with a generally wider portion 38 which is formed at its lower end 40. The slot 32 is defined by a pair of spaced apart, generally parallel first pair of wall portions 42, 44 which extend from the upper surface 46 of the fastener 12 and a second pair of spaced apart, generally parallel, wall portions 48, 50, with the space 52 between the wall portions 48, 50 being greater than the space 54 between the wall portions 42, 44. A pair of wall portions 56, 58 connect the wall portions 42 and 48 and the wall portions 44 and 50 with the wall portions 56, 58 being generally perpendicular to the wall portions 42, 44, 48, 50.

As is best shown in FIGS. 1–14, 19 and 20 the driver tool 14 includes a blade portion 80 which is connected at its lower end 82 to a pair of oppositely directed projecting portions 84, 86. The width of the projecting portions 84, 86 as defined by the distance between the end surface 88, 90 is somewhat less than the width of the narrower portion of the slot 16, as defined by the space 54 between the wall portions 42, 44 thereby enabling the driver tool 14 to enter the slot 16 from the vertical direction as indicated by arrow 92 in FIG. 3. The thickness of the projecting portions 84, 86 as defined by the distance between the wall portions 94, 96 is proportioned to allow the projecting portions 84, 86 to easily engage the slot 16 in the fastener 12. When the driver tool 14 is rotated in the direction shown by the arrow 18 in FIG. 2 the generally triangular portions 98, 100 of the driver tool 14 defined by the line segments 102, 104 engage adjacent portions 106, 108 of the slot 16.

Figure 4:
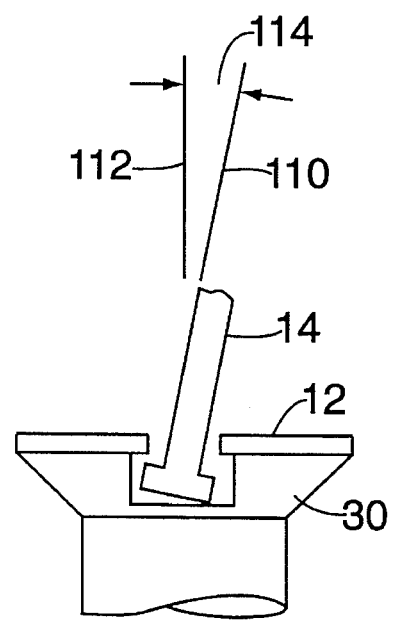
FIG. 4 is a side view similar to FIG. 3 showing the operation of the fastener system with the axes of the driver and the fastener misaligned yet still maintaining positive engagement between the fastener and the driver.

The driver tool 14 and the fastener 12 are proportioned to allow continuous and driving engagement between the driver tool 14 and the fastener 12 even if the longitudinal axes 110, 112 of the driver 14 tool and the fastener 12 are misaligned and form an angular relationship as defined by the angle 114 in FIG. 4. This capability facilitates utilization of the fastener system 10 in confined spaces where there is limited space available for the operation of the driver tool 14.

The edges 97, 99 between the projecting portions 84, 86 and the wall portion 96 may be rounded to allow easier entry into the slot 16 and increased capability for operation when the driver 14 is misaligned.

The fastener 12 of FIGS. 1–6, and 8 has been shown as a flat head fastener in which the surface 31 of head 30 of the fastener 12 is designed to ultimately become flush with the surface 24 of the work-piece 26 or be below the surface 24 of the work-piece 26. This has been done for purposes of illustration and it should be understood that the principles of the present invention are equally applicable to fasteners such as round-head, cap-head or pan-head fasteners in which the head is designed to remain above the surface of the work-piece 26.

Figure 5:
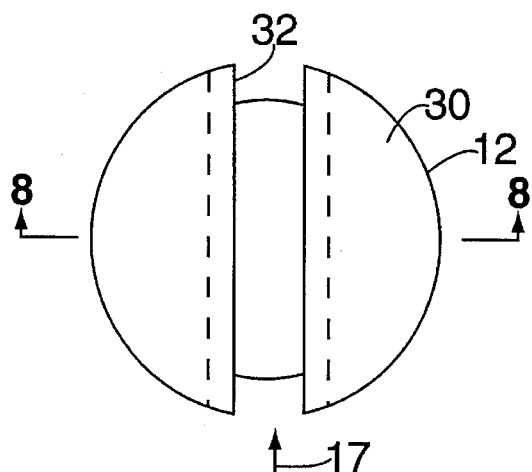
FIG. 5 is a top view of the fastener of FIG. 1.
Figure 8:
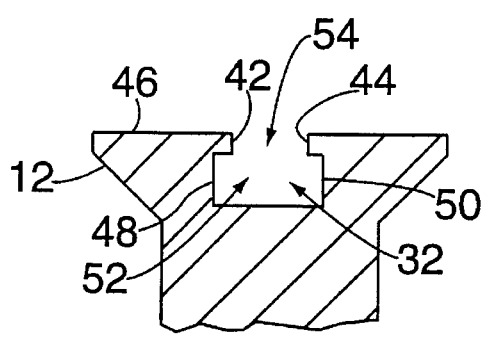
FIG. 8 is a cross-sectional view taken along the line 8—8 of FIG. 5.
Figure 6:
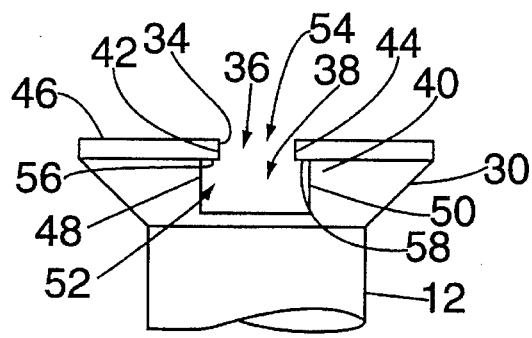
FIG. 6 is a side view of the fastener of FIG. 1.

The application of the present invention to fasteners in which the fastener head ultimately remains positioned above the top surface of the work-piece, such as a round head fastener, enables the driver as an alternate embodiment, to be proportioned so that it can enter and leave the slot in a lateral direction that is a direction parallel to the slot 16 as shown by the arrow 17 in FIG. 5 in lieu of vertically as depicted by the arrow 92 in FIG. 3.

Figure 9:
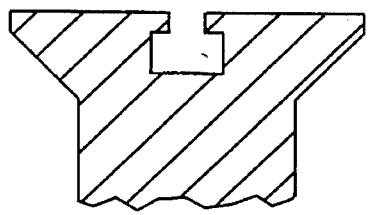
FIG. 9 is a cross-sectional view taken along the line 9—9 of FIG. 7.
Figure 7:
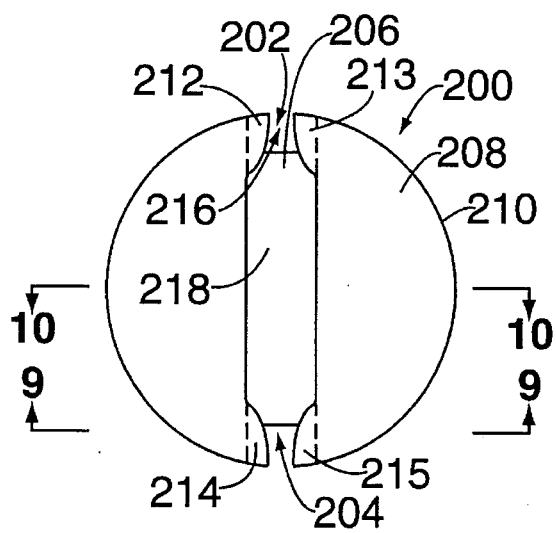
FIG. 7 is a top view of a second embodiment of the fastener of FIG. 1.
Figure 10:
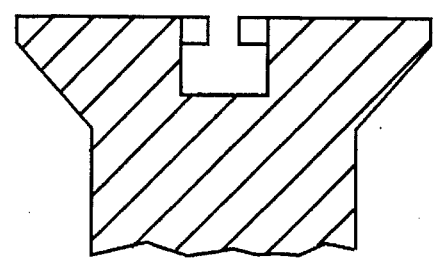
FIG. 10 is a cross-sectional view taken along the line 10—10 of FIG. 7.

FIGS. 7, 9 and 10 show a second embodiment of the invention 200 in which each end 202, 204 of the slot 206, which is formed in the head 208 of the fastener 210, has a pair of projecting portions 212, 213, and 214, 215 which are directed toward each other. The projecting portions 212, 213 and 214, 215 form a relatively narrower slot portion 216 which leads to a relatively wider slot portion 218. During use, the projecting portions 212, 213, 214, 215 engage the projecting portions 84, 86 of a driver tool 14 in generally the same manner as has been previously described in connection with FIGS. 1, 2, 3 and 4. The projecting portions 84, 86 of the driver tool 14 engage either the projecting portions 212, 213 or the projecting portions 214, 215 depending on the direction of rotation of the fastener tool 14.

Figure 22A:
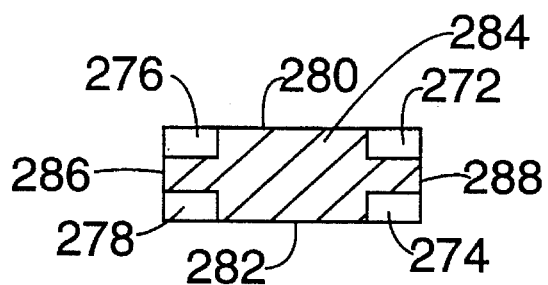
FIG. 22A is a cross-sectional view taken along the line 22A—22A of FIG. 21.

Alternatively, a driver tool 270 such as the one shown in FIGS. 21 and 22 may be utilized with the fastener 200 shown in FIG. 7. The driver tool 270 shown in FIGS. 21, 22 and 22A includes a pair of undercut portions 272, 274, 276, 278 formed on each of the faces 280, 282 of the blade 284 with the undercut portions 272, 274, 276, 278 being positioned adjacent the edges 286, 288 of the blade 284. The undercut portions 272, 274, 276, 278 may be positioned to engage the projecting portions 212, 213, 214, 215 of the fasteners 200.

Figure 11:
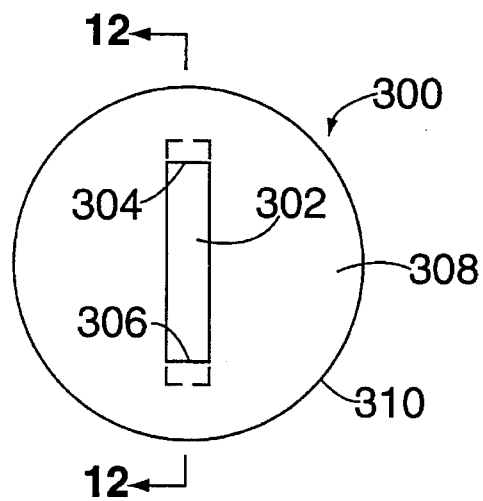
FIG. 11 is a top view of a third embodiment of the fastener of FIG. 1.
Figure 12:
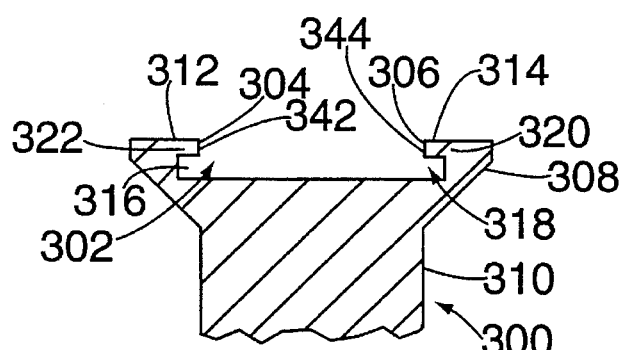
FIG. 12 is a cross-sectional view taken along the line 12—12 of FIG. 11.

FIGS. 11 and 12 show a third embodiment 300 of the invention in which a slot 302 having closed ends 304, 306 is formed in the head 308 of a fastener 310. The portions 312, 314 of the fastener head 308 adjacent to the closed ends 304, 306 of the slot 302 have undercut portions 316, 318 shown in broken lines in FIG. 11 and shown in cross-section in FIG. 12. The undercut portions 316, 318 define projecting portions 320, 322 which cooperate with a driver tool such as the driver tool 324 shown in FIGS. 27 and 28 or the driver tool 326 shown in FIGS. 29 and 30.

Figure 28:
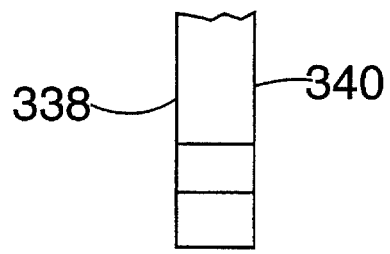
FIG. 28 is an end view of the driver of FIG. 27.

The driver tool 324 shown in FIGS. 27 and 28 has a pair of undercut portions 328, 330 or notches formed in the ends 332, 334 of the blade 336. In use, the driver tool 324 is inserted into the slot 302 in a vertical direction, the width of the blade 336 as defined by the distance between the surfaces 338, 340 shown in FIG. 27 being slightly less than the distance between the projecting surfaces 342 and 344 as shown in FIG. 12. When the driver tool 324 is pressed downward, moved laterally and rotated, the projecting portions 346 or 348 of the blade 336 project into the undercut portions 316 or 318 and the driver tool 324 and the fastener 310 are interlocked.

Figure 29:
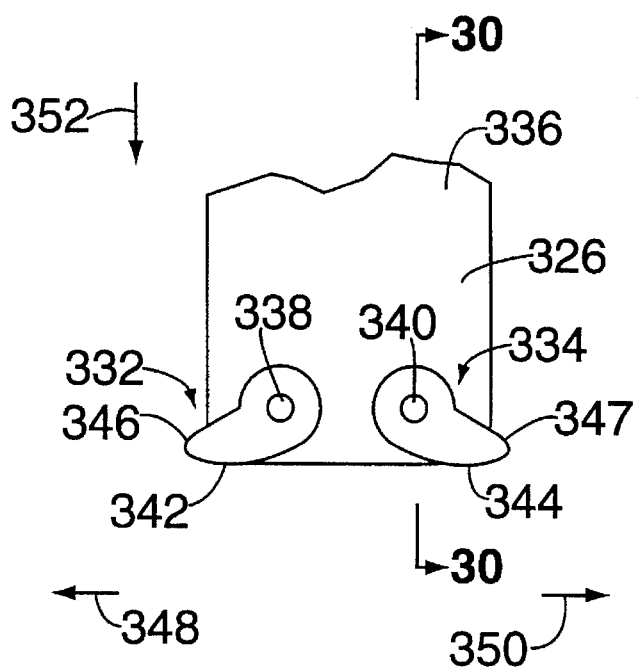
FIG. 29 is a side view of a sixth embodiment of the driver of FIG. 19.
Figure 30:
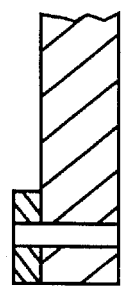
FIG. 30 is a cross-sectional view taken along the line 30—30 of FIG. 29.
Figure 43:
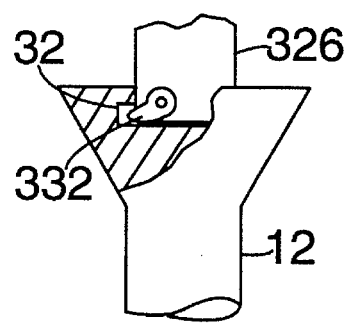

The driver tool 326 shown in FIGS. 29 and 30 includes a pair of pivotally mounted cam members 332, 334. The cam members 332, 334 are pivotally mounted on the blade 336 by means of shafts 338, 340 and the cam members 332, 334 each include a cam surface 342, 344 which forces the ends 346, 347 of the cam members 332, 334 to project outwardly in the directions shown by the arrows 348, 350 in FIG. 29 when a downward force is applied to the blade 336 in the direction shown by the arrow 352. The driver tool 326 shown in FIGS. 29 and 30 may be used with the fastener head shown in FIG. 7 as well as the fastener head shown in FIG. 11. The driver tool 326 is also shown in FIG. 43 which displays the pivotally mounted cam member 332 engaged in the slot 32 of a fastener 12.

Figure 15:
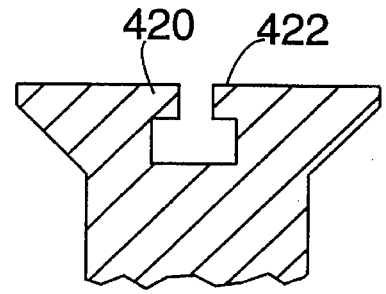
FIG. 15 is a cross-sectional view taken along the line 15—15 of FIG. 13.
Figure 13:
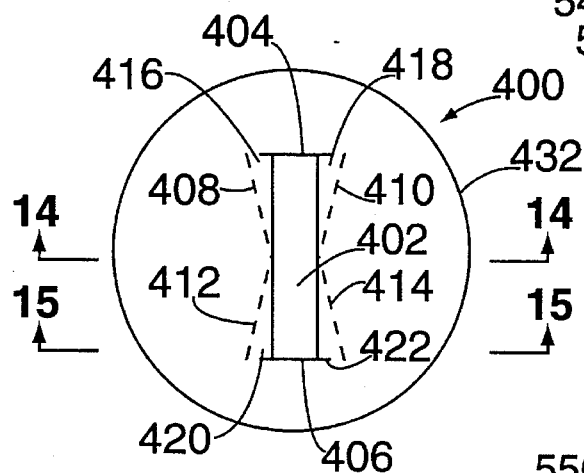
FIG. 13 is a top view of a fourth embodiment of the fastener of FIG. 1.
Figure 14:
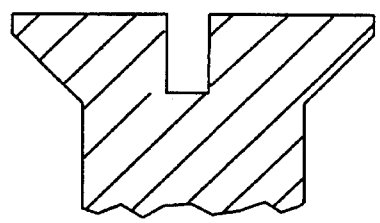
FIG. 14 is a cross-sectional view taken along the line 14—14 of FIG. 13.

FIGS. 13, 14 and 15 show a fourth alternative embodiment 400 of the invention in which a slot 402, having closed ends 404, 406 is formed in the fastener head 432. The slot 402 has a plurality of triangularly shaped undercut portions 408, 410, 412, 414 are shown in broken lines in FIG. 13. The undercut portions 408, 410, 412, 414 define projecting portions 416, 418, 420, 422 shown in FIG. 15 which cooperate with a driver tool such as the driver tool 14 shown in FIGS. 1, 19, 20, the driver tool 426 shown in FIGS. 23, 24, the driver tool 428 shown in FIGS. 25, 26 or the driver tool 324 shown in FIGS. 27, 28.

Figure 16:
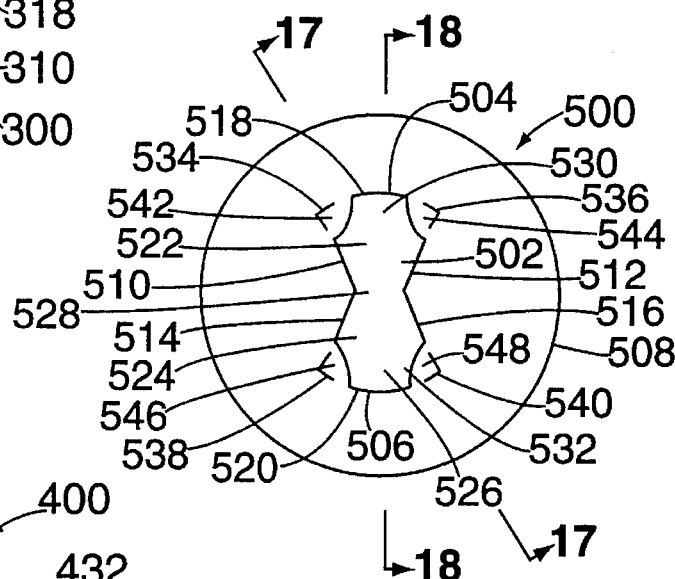
FIG. 16 is a top view of a fifth embodiment of the fastener of FIG. 1.
Figure 17:
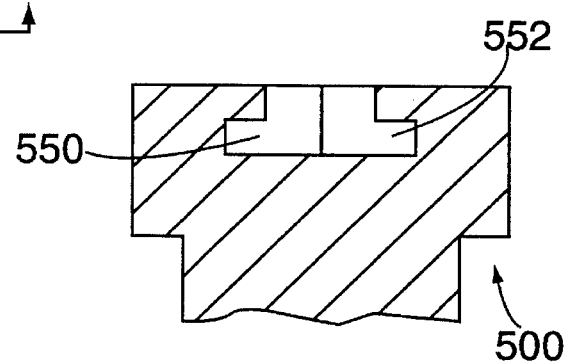
FIG. 17 is a cross-sectional view taken along the line 17—17 of FIG. 16.
Figure 18:
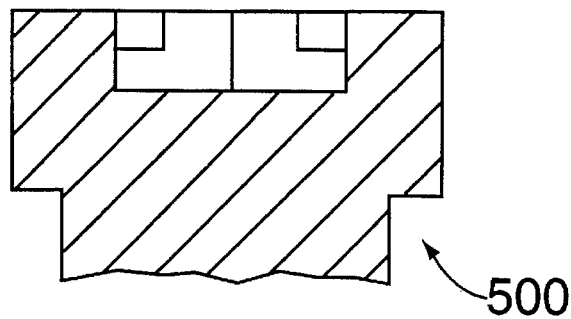
FIG. 18 is a cross-sectional view taken along the line 18—18 of FIG. 16.

FIGS. 16, 17, 18 show a fifth alternative embodiment 500 of the invention in which a slot 502 having closed ends 504, 506 is formed in the fastener head 508. The slot 502 is defined by two pairs of converging side wall portions 510, 512 and 514, 516 and a pair of end wall portions 518, 520. The end wall portion 518 joins the converging side wall portions 510, 512 to form a truncated triangular slot portion 522 and the end wall 520 portion joins the converging side wall portion 514, 516 to form a truncated triangular slot portion 524. The two triangular slot portions 522, 524 communicate to form a slot 526 which has a relatively narrow central portion 528 and a pair of relatively wider end portions 530, 532. At each of the corners 534, 536, 538, 540 of the slot 502 where a side wall 510, 512, 514, 516 joins an end wall portion 518, 520, a portion 542, 544, 546, 548 of the fastener head 508 is disposed projecting partially over the slot 502. These projecting portions 542, 544, 546, 548 of the fastener head 508 form four undercut portions, two of which 550, 552 are showing typically in FIG. 17.

The fastener 500 shown in FIGS. 16, 17 and 18 may be used with a number of the driver tools which have been shown and previously described included among which is the driver tool shown in FIGS. 19, 20. During use, diagonally opposite portions of the fasteners head such as the portions 542, 548 project over and thereby engage portions of the driver tool 14 in an interlocking engagement in a manner which is generally similar to the engagement of the driver tool 14 with the fastener head 12 shown in FIG. 2.

The fasteners shown in FIGS. 13, 14, 15, 16, 17, 18 facilitate increased contact between the fastener and the driver tool as a result of the angular configuration of the slots.

Figure 31:
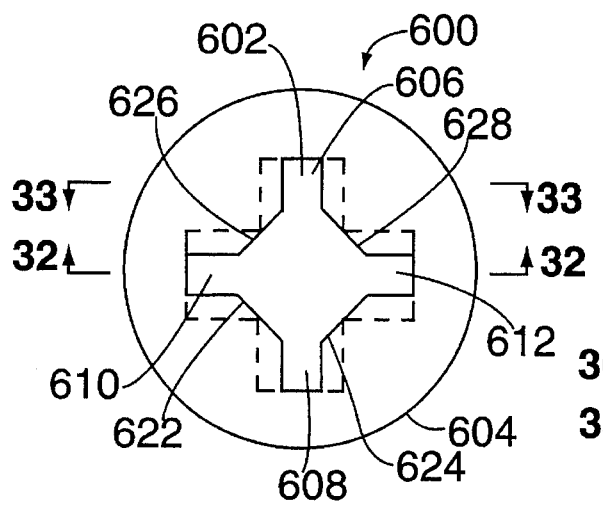
FIG. 31 is a top view of a sixth embodiment of the fastener of FIG. 1.
Figure 32:
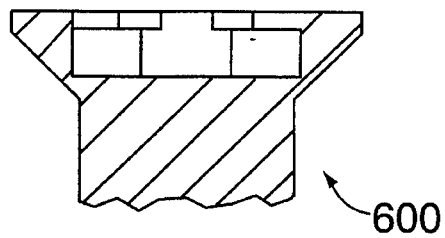
FIG. 32 is a cross-sectional view taken along the line 32—32 of FIG. 31.
Figure 33:
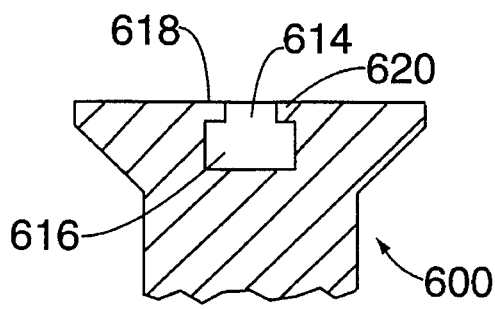
FIG. 33 is a cross-sectional view taken along the line 33—33 of FIG. 31.

FIGS. 31, 32, 33 show a sixth alternative embodiment 600 of the invention in which a crossed slot 602 having a novel configuration is formed in the fastener head 604. The slot 602 is formed by a first pair of aligned slot portions 606, 608 which interset with a second pair of aligned slot portions 610, 612. Each of the slot portions 606, 608, 610, 612 has a T shaped cross section as is best shown in FIG. 33. The slot portions 606, 608, 610, 612 each have a narrower upper portion which is designated typically by the numeral 614 which communicates with a wider lower portion which is designated typically by the numeral 616. The narrower and wider slot portions 614, 616 are defined in part by projecting portions designated typically by the numerals 618, 620 in FIG. 33. The function of the projecting portions 618, 620 is to project over and interlock with complementary portions of a driver tool in a manner which is similar to the manner which has been previously described in connection with FIG. 1.

The crossed slot 602 is further defined by vertical wall portions 622, 624, 626, 628 which are disposed at an angle to the longitudinal axes of the slot portions 606, 608 which is the order of 45 degrees.

Figure 34:
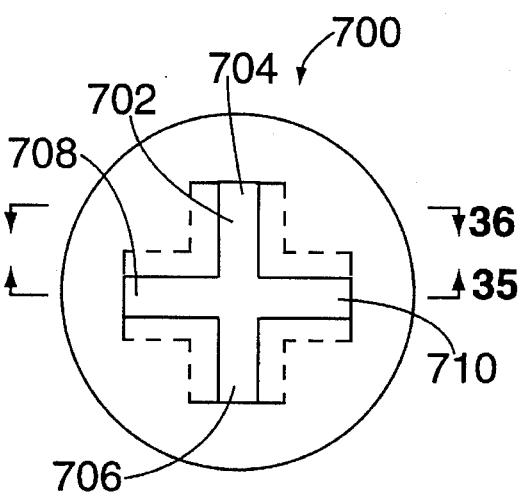
FIG. 34 is a top view of a seventh embodiment of the fastener of FIG. 1.
Figure 35:
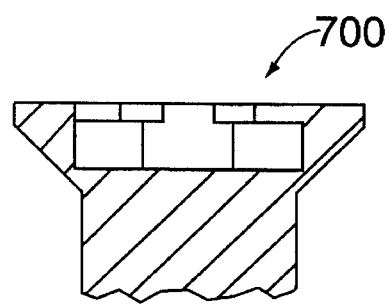
FIG. 35 is a cross-sectional view taken along the line 35—35 of FIG. 34.
Figure 36:
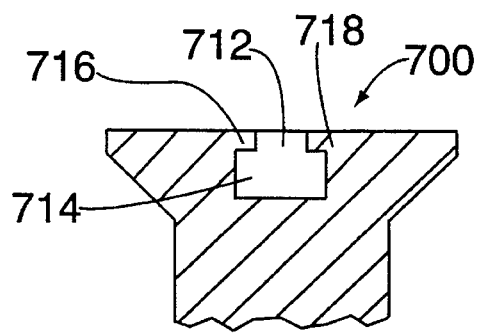
FIG. 36 is a cross-sectional view taken along the line 36—36 of FIG. 34.

FIGS. 34, 35, 36 show a seventh alternative embodiment 700 of the present invention which is generally similar to the sixth alternative embodiment 600 of the present invention shown in FIG. 31 with the exception that the vertical wall portions 622, 624, 626, 628 have been eliminated. The crossed slot 702 is formed by a first pair of aligned slot portions 704, 706 which intersect with a second pair of aligned slot portions 708, 710. Each of the slot portions 704, 706, 708, 710 has a T shaped cross section as is best shown in FIG. 36. The slot portions 704, 706, 708, 710 each have a narrower upper portion which is designated typically by the numeral 712 which communicates with a wider lower portion which is designated typically by the numeral 714. In a manner similar to that which has been previously described, the narrower and wider slot portions are defined in part by projecting portions 716, 718 shown in FIG. 36.

The function of the projecting portions 716, 718 is to project over and interlock with complementary portions of a driver tool in a manner which is similar to the manner which has been previously described in connection with FIG. 1.

Figure 38:
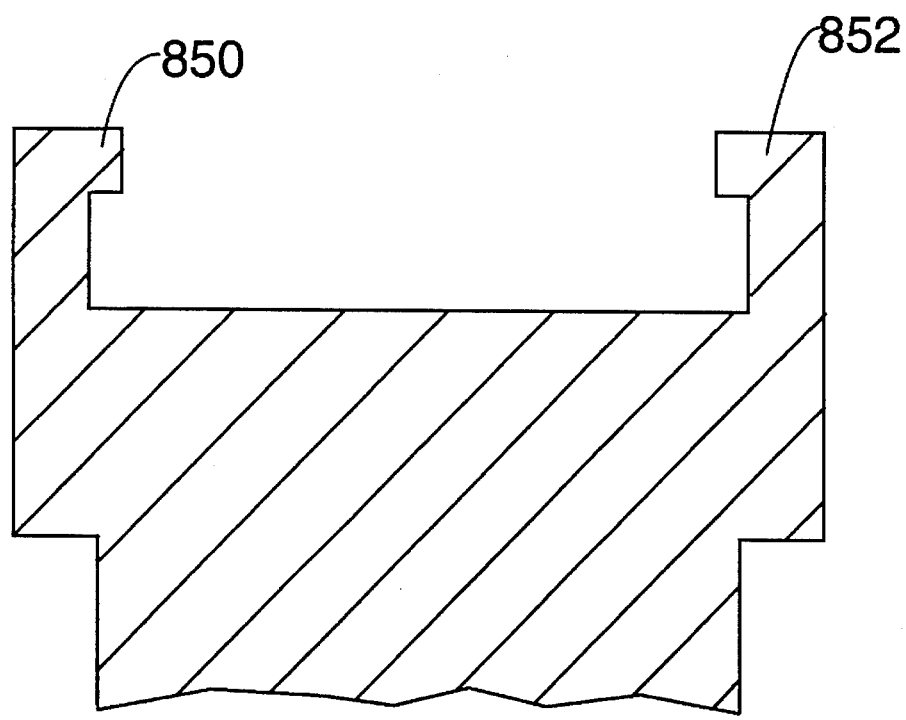
FIG. 38 is a cross-sectional view taken along the line 38—38 of FIG. 37.

FIGS. 37, 38 show an eighth alternative embodiment 800 of the invention in which the fastener head 802 has a socket cavity 804. The socket is defined in part by six vertical wall portions 806, 808, 810, 812, 814, 816 which form a hexagonal socket configuration which resemble a conventional socket head. The vertical wall portions 806, 808, 810, 812, 814, 816 form six wall intersections 814, 816, 818, 820, 822, 824. Adjacent to each of the six wall intersections 814, 816, 818, 820, 822, 824 there is formed a pair of oppositely directed undercut portions 826, 828, 830, 832, 834, 836, 838, 840, 842, 844, 846, 848, each of which communicates with the central hexagonal socket cavity 804.

The undercut portions 826, 828, 830, 832, 834, 840, 842, 844, 846, 848 are best shown in FIG. 37 and they are defined in part by projecting portions which are designated typically by the numerals 850, 852 in FIG. 38. The function of the projecting portion 850, 852 is to project over and interlock with a portion of a driver tool such as the driver tool 854 which is shown in FIGS. 39, 40.

The driver tool 854 includes a shaft portion 856 on one end 858 of which now is disposed six projecting lobe portions 860, 862, 864, 866, 868, 870. Each of the lobe portions 860, 862, 864, 866, 868, 870 is generally triangular in configuration and the lobes are proportioned for easy insertion into the socket cavity 804. In order to facilitate this insertion the distance between opposite apexes of the lobes are slightly smaller than the distance between complementary wall intersections.

In operation, the driver tool 854 is inserted into the socket cavity 804 in the vertical direction. The driver tool 854 is then turned, for example, in the direction shown by the arrow 871 in FIG. 39 and the lobes 860, 862, 864, 866, 868, 870 enter the undercut portions 828, 832, 836, 840, 844, 848 and the projecting portions 850, 852 interlock with driver tool 854. If for example the driver tool 854 is rotated in the direction shown by the arrow 872 in FIG. 39, the lobes 860, 862, 864, 866, 868, 870 enter the undercut portions 826, 830, 834, 838, 842, 846 and the projecting portions 850, 852 again interlock with the driver tool 854.

The utilization of the various embodiments of the fasteners and the driver tools may be summarized according to Table I, which relates the Figure numbers which depict the various embodiments of the fasteners and the drivers according to the present invention.

TABLE I

| FASTENER EMBODIMENT NO. | FASTENER FIG. NOS. | DRIVER TOOL FIG. NOS. |
| --- | --- | --- |
| 1 | 1, 2, 3, 4, 5, 6, 8 | 1, 19, 20, 21, 22, 22, 22A, 23, 24, 25, 26, 27, 28 |
| 2 | 7, 9, 10 | 1, 19, 20, 21, 22, 22, 22A, 23, 24, 25, 26, 27, 28, 29, 30 |
| 3 | 11, 12 | 29, 30 |
| 4 | 13, 14, 15 | 1, 19, 20, 21, 22, 22A, 23, 24, 25, 26, 27, 28 |
| 5 | 16, 17, 18 | 1, 19, 20, 21, 22, 22A, 23, 24, 25, 26 27, 28, 29, 30 |
| 6 | 31, 32, 33 | 1, 19, 20, 21, 22, 22A, 23, 24, 25, 26, 27, 28, 29, 30 |
| 7 | 34, 35, 36 | 1, 19, 20, 21, 22, 22A, 23, 24, 25, 26, 27, 28, |
| 8 | 37, 38 | 21, 22, 22A, 25, 26, 27, 28, 29, 30, 39, 40 |

Figure 41:
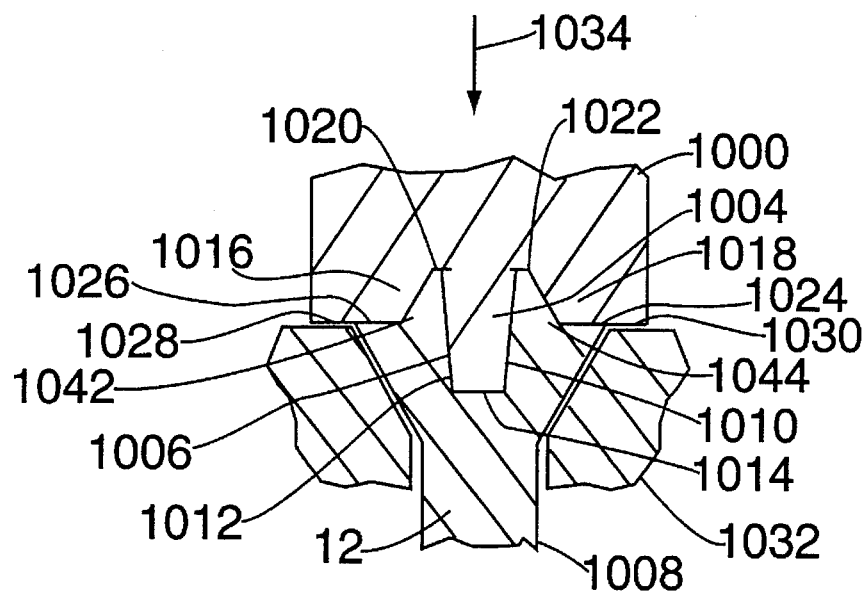
FIG. 41 is a cross-sectional view of the first stage of forming a fastener according to the present invention by a cold-forming process.
Figure 42:
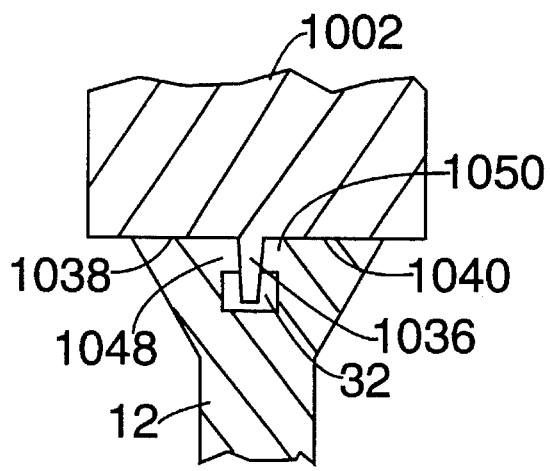
FIG. 42 is a cross-sectional view similar to FIG. 33 showing the second stage of forming the fastener by the cold-forming process and FIG. 43 is a cross-sectional view showing a pivotally mounted member in relation to a screw slot.

FIGS. 41 and 42 depict the successive stages of the novel method of manufacturing the fastener according to the present invention. The method of manufacture, according to the present invention, may be utilized tò manufacture each of the various fasteners shown in the various FIGS. and while the manufacture of the fastener head 12 has been shown in FIGS. 41 and 42 it should be understood that this has been done for purposes of illustration only. The method of manufacture according to the present invention utilizes a pair of novel cold-heading tools 1000, 1002, the first of which 1000 is shown in FIG. 41. The tool 1000 includes a central piercing portion 1004 which forms a wedge shaped cavity 1006 in the work-piece 1008. The piercing portion 1004 of the tool 1000 is defined by a pair of inclined surface portions 1010, 1012 which converge toward and are connected to a generally flat lower surface portion 1014. A pair of concave portions 1016, 1018 is formed in the tool 1000 adjacent to the upper ends 1020, 1022 of the piercing portion 1004. The outer edges 1024, 1026 of the concave portions 1016, 1018 terminate in a pair of flat portions 1028, 1030.

During use, in the first step, the central piercing portion 1004 pierces the work-piece 1008 forcing the work-piece material to flow into the concave portions 1016, 1018. During this first step, the work piece 1008 is held in a conventional mandrel or similar holding device which forms part of a conventional cold-heading machine. The mandrel 1032 is shown schematically in FIG. 41 and the tool 1000 is held in an operating portion of the cold-heading machine. The portion of the cold-heading machine which holds, advances and forms the conical surface of the fastener are well known in the art of manufacturing fasteners and therefore need not be described. In a similar manner, the apparatus within the cold-heading machine for applying a force in the direction shown by the arrow 1034 in FIG. 41 is also well known and therefore need not be described.

The novel feature of the method of manufacture according to the present invention comprises the step of piercing the work-piece 1008 using the piercing portion 1004 of the tool 1000, the lower portion of which is proportioned to form a slot cavity in the work-piece 1008 having a width equal to the width of the wider portion 38 of the slot 32 as shown in FIG. 5, forcing the work-piece material to flow into the cavities 1016, 1018 adjacent the piercing portion 1004 and the step which includes the use of the tool 1002 which will be presently described.

The tool 1002 has a projecting portion 1036 which is disposed between a pair of flat portions 1038, 1040. The width of the projecting portion 1036 is equal to the width of the narrower portion 36 of the slot 32 as shown in FIG. 5. When the tool 1002 of FIG. 42 is forced against the work-piece 1008, the projecting portion 1036 enters the slot portion 32 and the flat portions 1038, 1040 bear against the portions 1042, 1044 of the work-piece 1008, which were formed by the portions 1016, 1018 of the tool 1000. The flat portions 1038, 1040 of the tool 1002 flatten the top of the work-piece 1008 forcing the portions 1042, 1044 to flow into the slot 32 while the projecting portion 1036 forms and maintains the configuration of the narrower portion of the slot 32. The flow of the portions 1042, 1044 into the upper portions of the slot 32 forms the projecting portions 1048, 1050 of the fastener 12.

While preferred embodiments of the invention have been shown and described herein, it is obvious that numerous additions, changes and omissions may be made in such embodiments without departing from the spirit and scope of the invention.

What is claimed is:

1. A method for the manufacture of a fastener comprising the steps of mounting a fastener blank in a holder;

piercing said fastener blank to form an aperture;

urging said fastener blank material displaced by said step of piercing to flow upwardly alongside aperture;

inserting a forming member into said aperture while simutaneously pressing downward on said displaced material causing said displaced material to radially flow toward said aperture thereby forming a recessed portion in said aperture; and sizing and positioning said forming member to to limit said radial flow to precisely control final dimensions of said recessed portion.

2. A method for the manufacture of a fastener according to claim 1, wherein said step of mounting said fastener blank in said holder includes mounting said holder in a cold-heading apparatus.

* * * * *